US010934663B2

(12) United States Patent
Hansen

(10) Patent No.: US 10,934,663 B2
(45) Date of Patent: *Mar. 2, 2021

(54) INDUSTRIAL FABRIC COMPRISING AN EXTRUDED MESH AND METHOD OF MAKING THEREOF

(71) Applicant: Albany International Corp., Rochester, NH (US)

(72) Inventor: Robert A. Hansen, North Muskegon, MI (US)

(73) Assignee: Albany International Corp., Rochester, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/038,329

(22) Filed: Jul. 18, 2018

(65) Prior Publication Data

US 2019/0032278 A1 Jan. 31, 2019

Related U.S. Application Data

(62) Division of application No. 15/164,064, filed on May 25, 2016, now Pat. No. 10,041,210, which is a
(Continued)

(51) Int. Cl.
*B29C 48/05* (2019.01)
*B29C 48/21* (2019.01)
(Continued)

(52) U.S. Cl.
CPC .......... *D21F 1/0036* (2013.01); *B29C 48/05* (2019.02); *B29C 48/21* (2019.02); *B29D 28/005* (2013.01);
(Continued)

(58) Field of Classification Search
CPC ... B29C 48/301; B29C 48/0014; B29C 48/05; B29C 48/08; B29C 48/21; B29C 48/30;
(Continued)

(56) References Cited

U.S. PATENT DOCUMENTS

RE21,890 E 8/1941 Walsh et al.
2,581,790 A 1/1952 Gates
(Continued)

FOREIGN PATENT DOCUMENTS

GB 969655 A * 9/1964 ............ B29C 48/30
GB 2 197 886 A 6/1988
(Continued)

OTHER PUBLICATIONS

International Search Report and Written Opinion issued by European Patent Office acting as the International Searching Authority for corresponding international application PCT/US2014/023355 dated Jun. 25, 2014.

*Primary Examiner* — Michael A Tolin
(74) *Attorney, Agent, or Firm* — McCarter & English, LLP

(57) ABSTRACT

A structure for use in industrial fabrics such as paper machine clothing and engineered fabrics. The structure is a bicomponent extruded elastomeric netting or mesh having a high degree of both compressibility under an applied normal load and excellent recovery (resiliency or spring back) upon removal of that load.

40 Claims, 7 Drawing Sheets

Related U.S. Application Data division of application No. 13/834,638, filed on Mar. 15, 2013, now Pat. No. 9,352,530.

(51) Int. Cl.

| | | |
|---|---|---|
| *B29D 28/00* | (2006.01) | |
| *B32B 25/10* | (2006.01) | |
| *B32B 5/12* | (2006.01) | |
| *B32B 5/26* | (2006.01) | |
| *D21F 1/00* | (2006.01) | |
| *D21F 3/02* | (2006.01) | |
| *D21F 7/08* | (2006.01) | |
| *B32B 5/02* | (2006.01) | |
| *B29L 9/00* | (2006.01) | |

(52) U.S. Cl.
CPC .............. *B32B 5/022* (2013.01); *B32B 5/028* (2013.01); *B32B 5/12* (2013.01); *B32B 5/26* (2013.01); *B32B 25/10* (2013.01); *D21F 1/0063* (2013.01); *D21F 3/0227* (2013.01); *D21F 7/083* (2013.01); *B29L 2009/00* (2013.01); *Y10T 428/24074* (2015.01); *Y10T 428/24091* (2015.01); *Y10T 428/24107* (2015.01); *Y10T 428/24116* (2015.01); *Y10T 428/24132* (2015.01)

(58) Field of Classification Search
CPC .... B29C 48/345; B29D 28/00; B29D 28/005; B32B 5/022; B32B 5/028; B32B 5/04; B32B 5/12; B32B 5/26; B32B 25/10; B32B 27/12; B32B 37/153; D21F 1/0036; D21F 1/0045; D21F 1/0063; D21F 1/0081; D21F 3/0227; D21F 3/0236; D21F 7/083; D21F 1/00; Y10T 428/24074; Y10T 428/24091; Y10T 428/24107; Y10T 428/24116; Y10T 428/24132; B29L 2009/00
See application file for complete search history.

(56) References Cited

U.S. PATENT DOCUMENTS

| | | |
|---|---|---|
| 3,059,312 A | 10/1962 | Jamieson |
| 3,086,276 A | 4/1963 | Bartz et al. |
| 3,664,905 A | 5/1972 | Schuster |
| 3,791,784 A | 2/1974 | Arechavaleta |
| 3,920,511 A | 11/1975 | Grieves et al. |
| 3,928,699 A | 12/1975 | Fekete |
| 4,107,371 A | 8/1978 | Dean |
| 4,186,780 A * | 2/1980 | Josef ................... D03D 3/04 139/383 AA |
| 4,241,123 A | 12/1980 | Shih |
| 4,350,731 A | 9/1982 | Siracusano |
| 4,351,872 A | 9/1982 | Brosseau et al. |
| 4,356,225 A | 10/1982 | Dufour |
| 4,427,734 A | 1/1984 | Johnson |
| 4,460,633 A | 7/1984 | Kobayashi et al. |
| 4,469,739 A | 9/1984 | Gretzinger et al. |
| 4,529,643 A | 7/1985 | Lundstrom |
| 4,555,440 A | 11/1985 | Crook |
| 4,565,735 A | 1/1986 | Murka, Jr. et al. |
| 4,636,419 A | 1/1987 | Madsen et al. |
| 4,673,015 A | 6/1987 | Andreasson |
| 4,728,565 A | 3/1988 | Fontana |
| 4,781,967 A | 11/1988 | Legge et al. |
| 4,798,760 A | 1/1989 | Diaz-Kotti |
| 4,830,915 A | 5/1989 | Diaz-Kotti |
| 4,980,227 A | 12/1990 | Sekiguchi et al. |
| 5,360,656 A * | 11/1994 | Rexfelt ................... D06H 5/005 139/383 A |
| 5,916,421 A * | 6/1999 | Yook ................... D21F 7/083 162/358.2 |
| 6,240,608 B1 | 6/2001 | Paquin et al. |
| 6,391,420 B1 | 5/2002 | Cederblad et al. |
| 2003/0124310 A1 | 7/2003 | Ellis et al. |
| 2007/0163741 A1 | 7/2007 | Crook |
| 2007/0194490 A1 | 8/2007 | Bhatnagar et al. |
| 2007/0202314 A1 | 8/2007 | Youn et al. |
| 2007/0243964 A1* | 10/2007 | Hagfors ................ D21F 3/0227 474/260 |
| 2009/0047855 A1 | 2/2009 | Seth et al. |
| 2010/0129597 A1 | 5/2010 | Hansen et al. |
| 2010/0262107 A1 | 10/2010 | Turner et al. |
| 2012/0189806 A1 | 7/2012 | Hansen et al. |
| 2014/0272269 A1 | 9/2014 | Hansen |
| 2014/0272270 A1 | 9/2014 | Hansen |

FOREIGN PATENT DOCUMENTS

| | | |
|---|---|---|
| WO | WO 2004/072368 A | 8/2004 |
| WO | WO 2007/067949 A | 6/2007 |
| WO | WO 2009/086533 A | 7/2009 |
| WO | WO 2010/141319 A | 12/2010 |
| WO | WO 2012/100161 A | 7/2012 |
| WO | WO 2012/100166 A | 7/2012 |

* cited by examiner

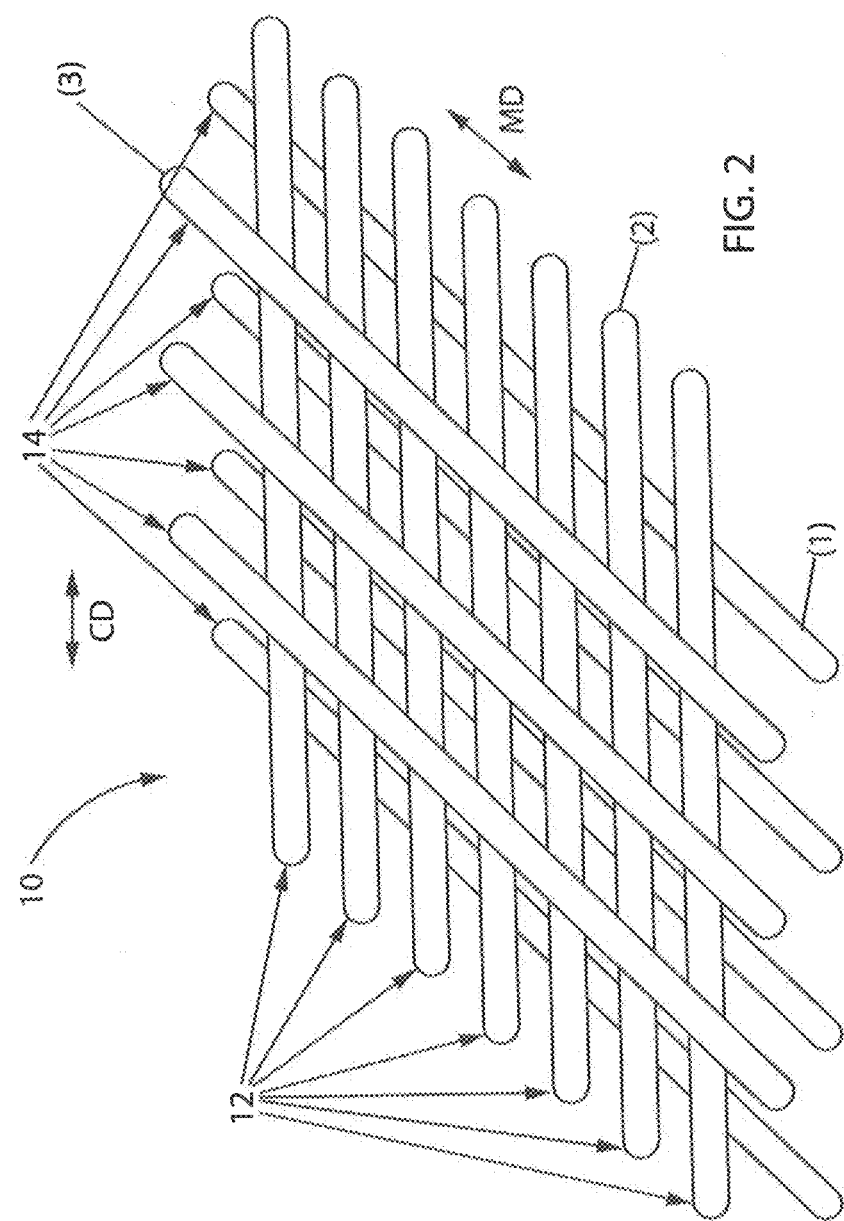

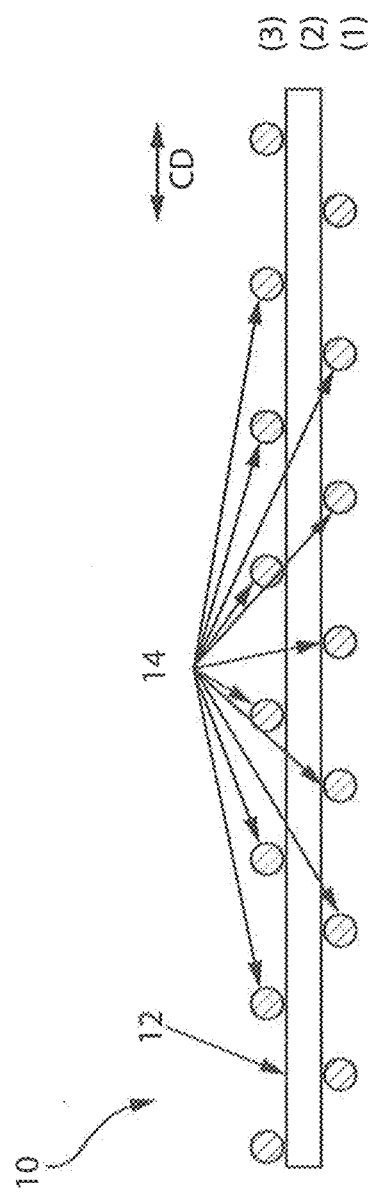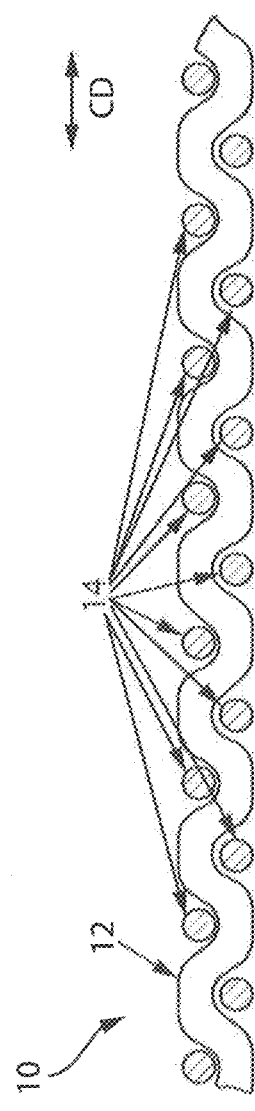

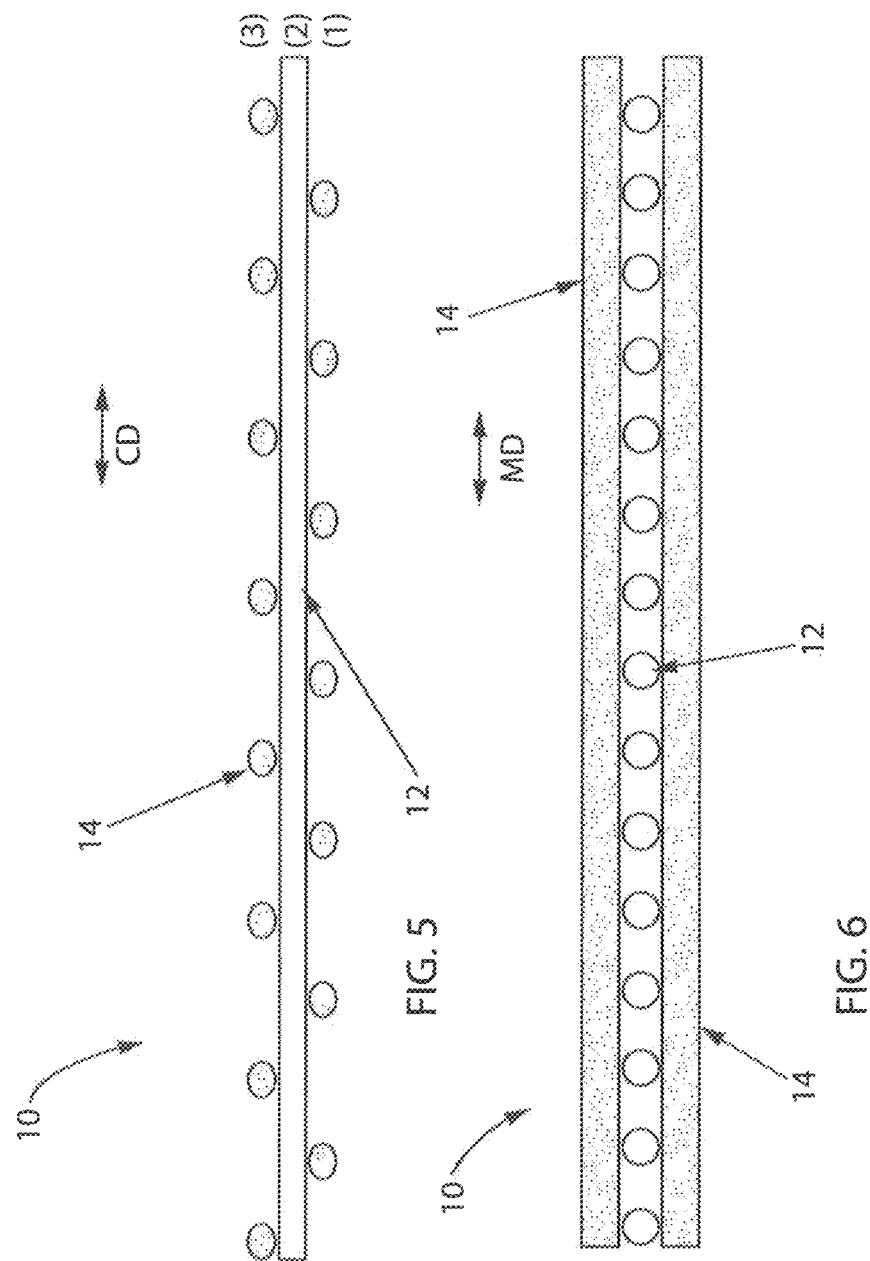

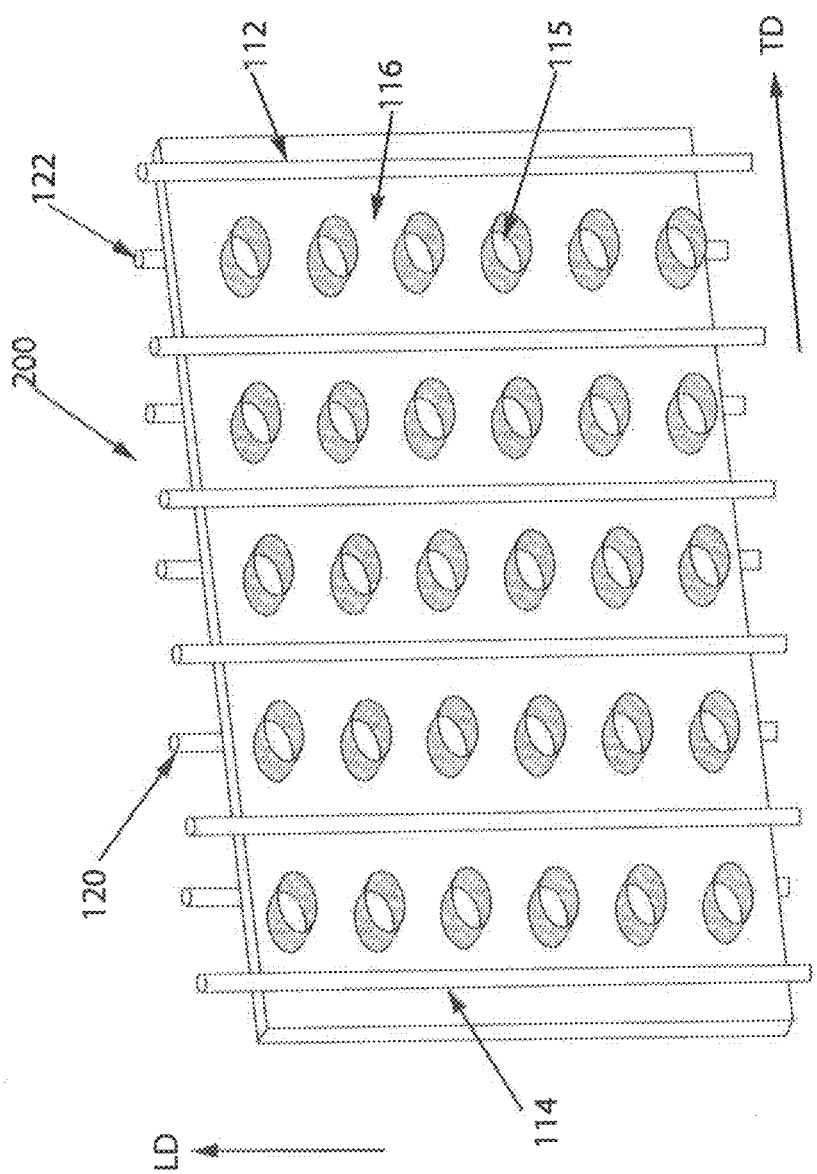

INDUSTRIAL FABRIC COMPRISING AN EXTRUDED MESH AND METHOD OF MAKING THEREOF

CROSS REFERENCE TO RELATED APPLICATIONS

This application is a division of U.S. patent application Ser. No. 15/164,064 filed May 25, 2016, now U.S. Pat. No. 10,041,210, which is a division of U.S. patent application Ser. No. 13/834,638 filed Mar. 15, 2013, now U.S. Pat. No. 9,352,530 granted May 31, 2016, the entire contents of which are incorporated herein by reference.

FIELD OF THE INVENTION

The present invention relates to a structure for use in industrial fabrics such as paper machine clothing and engineered fabrics. More specifically, the structure is an extruded bicomponent elastomeric netting or mesh having both elastomeric strands or members and relatively inelastic strands, and exhibits a high degree of both compressibility under an applied normal load and excellent recovery (resiliency or spring back) upon removal of that load.

BACKGROUND OF THE INVENTION

An industrial fabric means an endless structure in the form of a continuous loop such as one used as a forming, press or dryer fabric (paper machine clothing or PMC) as well as a process belt such as a shoe press, calendar, or transfer belt used on a paper machine. Industrial fabrics also means fabrics used in textile finishing processes. Industrial fabrics also include other endless belts where a high degree of compressibility and resiliency is required.

While the discussion herein concerns for the most part the papermaking process in general, the application of the invention is not considered limited thereto.

In this regard, during the papermaking process, for example, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Base fabrics, which form an important portion of the above discussed fabrics, take many different forms. For example, they may be woven either endless or flat woven and subsequently rendered into endless form with a woven seam using one or more layers of machine direction (MD) and cross machine direction (CD) yarns. Also such fabrics may employ what is referred to as a pin seam also formed from MD yarns to allow installation on the paper machine. Further, the base fabrics may be laminated by placing one base fabric within the endless loop formed by another base fabric, and joining or laminating them together by various means known to those skilled in the art such as by needling staple fiber batt through both base fabrics to join them to one another.

In paper machine clothing (PMC) especially press fabrics used in the press section of a paper machine, the fabric has one or more "base structures" formed from yarns and staple fiber batt needled into usually at least the sheet contact surface. The press fabric has an initial thickness, mass, and consequent void volume (the calculated volume based upon this mass and thickness) which equates to water handling capacity. They also have a measurable contact area.

Since press fabrics are subjected to normal loads (normal to the fabric plane in use) as it passes through one or more press nips, the fabric, since it is compressible itself and contains compressible components, has a compressed void volume and surface contact area as well. While there have been various attempts to change the degree of compressibility, and to introduce a degree of resiliency (spring or bounce back), press fabrics become progressively thinner over time and millions of nip cycles. Eventually they must be removed due to various reasons such as lack of water handling capability, marking, or press vibration. When they have reached the end of their useful lifetime and they must be removed and replaced with a new fabric.

New fabrics also go through a break in period wherein the density is not ideal and water handling is less than optimum. Accordingly, an ideal press fabric is one that has constant or steady state performance (for example water handling capability) from day one until it is removed from the paper machine.

Various attempts have been made to affect press fabric properties, especially compressibility and resiliency. One attempt has been to introduce "elastic" yarns into structures. One example of this is seen in PCT application WO 2004/072368 A1. There are shortcomings to this approach however. The compressibility is only due to the elastic portion (in the through thickness direction) of the yarn, and is therefore limited to such. While larger yarns can be used, there is eventually a diminishing return on performance. Also large yarns are heavy, and can cause objectionable sheet marking. If the yarn is a sheath/core type, there is always the danger of delamination of the sheath from the core. Finally, the degree of compressibility is limited to a maximum of some fraction of the yarn diameter.

Another example is U.S. Patent application 2007/0163741 A1 which incorporates an array of compressible sheath/core yarns attached to the backside of a seamed press fabric. It is taught that the sheath is elastomeric, and can provide vibration dampening effects. It further teaches that the yarn core alone can be 200 to 2000 denier, and a total size of 0.30 to 1.2 mm in diameter. Such yarn sizes can be limited in use due to weight and potential marking considerations.

A further example is U.S. Pat. No. 4,350,731, which teaches the use of wrapped yarns to make a compressible press fabric structure. Again the degree of compressibility and recovery (resiliency) is due to only the elastomeric wrapping sheath layers.

Another example of this type of resilient, compressible structure is taught in GB 2 197 886. This patent discloses compressible yarns which alternated in some manner with functional (tensile) load bearing yarns to provide, under an applied normal load, a dense, quasi-single layer base structure without "knuckles" and with long weave floats to provide a quasi-crossless base construction.

Incorporating "elastic" (in the thickness or radial direction) yarns into fabrics has affected to some degree the resiliency or spring back of these fabric structures once the normal load is removed. But again, using these yarns, the compressibility and spring back is limited to some portion of the yarn diameter at most.

As stated above, because of this limited resiliency, press fabrics have a relatively high void volume to handle water when new, more than is ideally required. They will compact and reach an optimum performance level for a period of time. However as they have limited resiliency, they will continue to compact, eventually requiring removal and replacement.

Certain special designs are classified as "crossless" in that the yarns in the MD and CD do not interweave with each other, but are stacked orthogonal to each other and lie in separate planes.

Various techniques have been employed to create such structures. One example of such a structure is taught in U.S. Pat. No. 4,781,967. Such a structure is defined to be relatively incompressible as the stacked yarn arrays do not compress nor move relative to any other layer. In other words, when there is an applied load normal to the plane of the structure, there is little thickness change, except for any yarn deformation which is permanent. If an elastomeric (in the yarn thickness direction) is employed as the yarns in an entire layer, the compressibility of the structure is limited to some portion of that yarn diameter.

Another example of a multilayer crossless structure that has layers of functional MD and CD yarns oriented 90 degrees to each other in separate planes, is taught in U.S. Pat. No. 4,555,440. Again this structure is considered incompressible as there is little through thickness change when a normal load is applied or removed. One embodiment does teach one layer of yarns to be compressible and resilient to add some level of this characteristic to an otherwise incompressible structure.

In related art, U.S. Pat. No. 6,391,420 describes a bicomponent netting product comprised of two different materials. An image of such a bicomponent netting without any load applied to the netting is shown FIG. 1(A), for example. In this example, the horizontal strands are made from an elastomeric material, while the vertical strands are made from a hard or stiff material. When this bicomponent netting is loaded in the horizontal direction, the netting readily stretches according to the low modulus or stiffness of the elastomeric material. In other words, the elastomeric strands stretch, and the bond between the elastomeric and hard strands cause the vertical strands to skew from an orthogonal pattern in the unloaded state, as shown in FIG. 1(B), for example.

It can be said, therefore, that the '420 patent focuses only on the in-plane stretch properties or unidirectional elasticity of this two layer structure.

SUMMARY OF THE INVENTION

It is a principal object of the present invention to provide an extruded mesh or netting that is substantially more compressible and resilient than those of the prior art, and one that not only addresses in-plane stretch properties, but also addresses through thickness properties of the structure.

One embodiment of the present invention is an ultra-resilient mesh or netting that utilizes a unique structure which provides excellent elastic behavior under a load applied normal to the surface of the mesh/net with high through thickness compressibility and recovery (resiliency). The instant structure utilizes an elastic component in at least one direction, which allows the entire structure to 'collapse' into itself under an applied normal load (i.e. pressure) based primarily upon the elasticity of this component and the structure geometry to conform under pressure and to "spring back" when the load (pressure) is removed, thus allowing this unique behavior.

One embodiment of the present invention is an extruded bicomponent elastomeric mesh or netting for use as at least a layer of a base support structure in industrial process belts, such as paper machine clothing (PMC), textile finishing belts, and other belts that require a high degree of compressibility and resiliency. The bicomponent mesh or netting may be produced by an extrusion die fed by two separate polymer streams. The bicomponent extruded mesh or netting is a structure comprising at least two layers of a relatively inelastic strand material in one direction and at least one layer of an elastic strand material that is co-extruded in the transverse direction. Any combination of materials to form the strand layers may be used, as long as the two types of materials are compatible from processing and rheological standpoints. For example, the strands of the two material streams should have good joint bond strength. The net or extruded mesh may comprise preferably a relatively inelastic material such as a polyamide in the machine direction ("MD") and an elastic material such as polyurethane in the cross machine direction ("CD"). For the sake of convenience, "MD" and "CD" as used herein refers to the orientation of the strands of the mesh or netting in use in a structure/fabric/belt used on an industrial process machine. The strands or members/components in any layer can have, for example, a round or a non-round cross sectional shape including square, rectangular, elliptical or oval, triangular, star-shaped, grooved or any polygonal shape.

The final structure can include one or more woven layers with the inventive bicomponent extruded mesh attached thereto. One or more layers of batt, nonwoven material, for example spunbond or meltblown, longitudinal or transverse direction yarn arrays, or spiral link fabrics may be also attached to this structure on the sheet side or machine contact side by methods known to those skilled in the art. "Sheet side" as used herein means the side (surface) facing the product which is being produced, conveyed etc, for example paper, when the fabric/belt comprising the mesh/netting is used on an industrial process machine. "Machine side" is the side/surface that is opposite the "sheet side" that contacts machine components such as support rolls when the fabric/belt is used on an industrial process machine.

Another embodiment of the present invention is a method of forming a bicomponent extruded mesh or netting including the steps of extruding at least two layers of a relatively inelastic strand material in one direction and co-extruding at least one layer of an elastic transverse strand material in the opposite direction. The net or mesh can be produced preferably with a relatively inelastic material such as a polyamide in the machine direction ("MD") and an elastic material such as polyurethane in the cross machine direction ("CD").

Another embodiment of the present invention is a compressible resilient bicomponent extruded mesh comprising one or more layers of an elastic extruded film or sheet, wherein the extruded film or sheet is elastic, resilient, and compressible in a thickness direction and extensible, bendable, and resilient in the length and transverse directions (MD and CD respectively), and two or more layers of a relatively inelastic member/component co-extruded on either side (surface) of the extruded film or sheet.

Yet another embodiment of the present invention is a method of forming a compressible resilient bicomponent extruded mesh. The method includes extruding one or more layers of an elastic film or sheet, wherein the extruded film or sheet is elastic, resilient, and compressible in a thickness direction and resilient, extensible and bendable in the length and transverse directions, and co-extruding two or more layers of a relatively inelastic member/components on top of and under the film or sheet surfaces.

The inventive bicomponent extruded mesh or netting can form or be included in any number of final industrial process fabrics/belts including: paper machine clothing, such as a forming fabric, a press fabric, a dryer fabric, a shoe press belt base, a calendar belt base, a transfer belt base, or an engineered fabric or belt such as that used in the production of nonwovens by processes such as airlaid, melt blowing, spunbonding, or hydroentangling, or a textile finishing belt, or a belt used in the production of corrugated boxboard, or a tannery belt or sleeve.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

While this invention may be embodied in many different forms, they are shown in the drawings and described in detail herein specific preferred embodiments of the invention. The present disclosure is an exemplification of the principles of the invention and is not intended to limit the invention to the particular embodiments illustrated.

FIG. 2 is a schematic profile view of a bicomponent extruded mesh, according to one embodiment of the present invention;

FIG. 3 is a schematic cross-sectional view of a bicomponent extruded mesh, according to one embodiment of the present invention;

FIG. 4 is a schematic cross-sectional view of a bicomponent extruded mesh, according to one embodiment of the present invention;

FIG. 5 is a schematic cross-sectional view of a bicomponent extruded mesh, according to one embodiment of the present invention;

FIG. 6 is a schematic cross-sectional view of a bicomponent extruded mesh, according to one embodiment of the present invention;

FIG. 9 is a profile view of a bicomponent extruded mesh, according to one embodiment of the present invention.

DETAILED DESCRIPTION

Figure 1A:
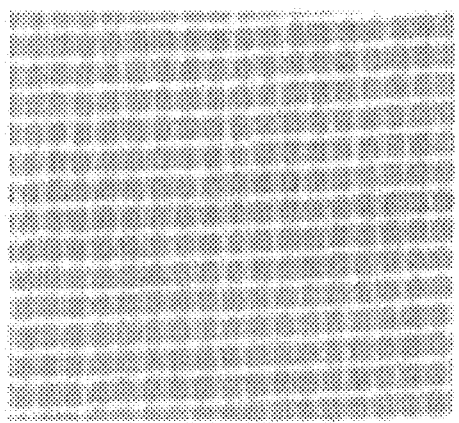
FIG. 1(A) is an image of a prior art netting without any load.
Figure 1B:
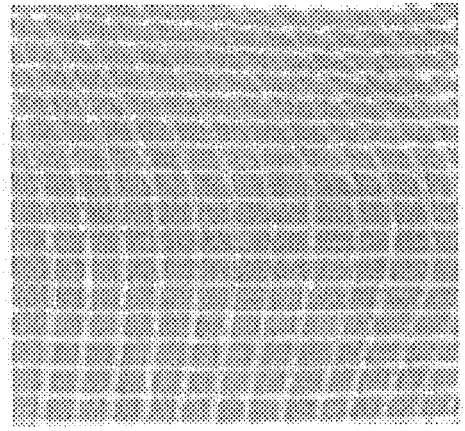
FIG. 1(B) is an image of a prior art netting with load applied in the horizontal direction.

For purposes of the present invention, the terms "cross machine direction" and "transverse direction" are synonymous and sometimes simply referred to as "CD", as are the terms "longitudinal direction" and "machine direction", sometimes simply referred to as "MD". However, the term "transverse" is sometimes also used to refer to strands/members/components which extend in a direction opposite to that of strands/members/components previously referred to. The meaning will be clear from the context in any particular instance.

Initially although a press fabric will be discussed, as aforesaid the present invention has application to other type fabrics or belts. With that said turning now more particularly to the figures, one embodiment of the present invention is a bicomponent extruded mesh 10 shown in FIG. 2 as having a first or bottom layer (1) comprised of functional strands 14 extruded in a parallel array oriented in the machine or running direction. A second or middle layer (2) of strands 12 is co-extruded orthogonal or at 90 degrees to the first layer (1). The strands 12 have the elastomeric features as aforesaid. A third or top layer (3) comprised of functional strands 14 is also co-extruded in the form of a parallel array orthogonal to layer (2). The strands 14 in layer (3) are positioned or aligned within the space between strands 14 in layer (1). Strands 14 in layers (1) and (3) are comprised of a relatively inelastic material. The strands in all layers are co-extruded polymeric elongate members which cross and intersect during extrusion to form the net-like structure shown in FIG. 2. The term "bicomponent" refers to the use of two different materials in the MD and CD, one being a relatively inelastic material in the MD, and the other being an elastic material in the CD. In one preferred embodiment, the inelastic material is polyamide and the elastic material is polyurethane. Members of all three layers can be of the same shape and size, or can be of different shapes and sizes.

Turning now to FIG. 3, in it is shown the bicomponent extruded mesh 10 in an uncompressed or relaxed or recovered state. Upon application of a compressive load normal to the surface of the bicomponent extruded mesh 10, the strands 12 will stretch allowing the strands 14 from layer (1) and (3) to move towards each other and to "nest" between each other in the same plane, as shown in FIG. 4. Upon release of the load, due to the elastic behavior of the strands 12, they will cause the strands 14 from layer (1) and (3) to move apart from each other or "spring back," returning the fabric to its desired thickness and openness as shown initially in FIG. 3. Such a structure is therefore compressible and resilient up to at least an entire elastic strand thickness.

These properties are important when the bicomponent extruded mesh is used in a press fabric as they affect: uniformity of pressure distribution under load as well as the total contact area; fast startup as the fabric compresses easily to the desired in nip void volume; vibration dampening as the structure acts as a dampening "spring;" and the quick recovery of thickness may help to minimize rewet during the expansion phase of post mid nip dewatering.

In another embodiment, strands 14 have the same position and relative orientation/spacing as above, but strands 12 are co-extruded and oriented at less than 90 degree angle to strands 14, preferably at a 45 degree angle.

According to one exemplary embodiment, there can be more than two layers of functional MD strands and more than one layer of CD strands. With three layers of MD strands and two layers of CD strands in between, two of the three MD strand layers, for example, must be spaced apart relative to each other to allow nesting. For example, top and middle MI) layers can be oriented such that strands in the middle layer fit in the space between two adjacent strands of the top MD, and strands in the bottom MD layer are stacked in vertical orientation with either the top or middle MD layers. Furthermore, two layers of CD strands can be elastomeric, or only one layer can be and the other layer can be a functional strand layer to aid in CI) stability or to provide a greater degree of void volume under load.

Also the degree of compression/resiliency is controlled by the elasticity of the required strands, size and number of strands, number of layers of the strands, and of course the totality of the structure itself. The inventive structure can also be part of a laminate with other strand arrays (MD and/or CD), spiral link fabrics, or woven base fabrics attached thereto.

In the case of a dryer fabric, the three layer embodiment, shown in the figures, may be particularly advantageous in that as the fabric structure passes around a roll, for example a dryer can, the strands in the dryer fabric will at least partially nest improving contact area of the paper sheet to the dryer can surface and therefore improve heat transfer. This would be caused by a temporary increase in MD tension as the dryer fabric passes around a roll and not due to any applied load normal to the fabric. In such a dryer fabric construction, the MD strands can be extruded from a polyester such as PET, and the CI) strands may be a thermoplastic polyester elastomer, for example.

The invention, according to one embodiment, is a method of forming a bicomponent extruded mesh or netting structure 10, as shown in FIGS. 2-6. Structure 10 is a fully extruded three layer bicomponent netting 10 that has excellent compressive and recovery properties. As shown in FIG. 2, the hard or stiff inelastic material 14 occupies upper layer (3) and lower layer (1) in a staggered fashion, and the elastomeric material 12 occupies the middle layer (2). The upper and middle layers (3, 2) are bonded to each other as are the middle and lower layers (2, 1) due to the extrusion process. The mesh structure can be extruded in the form of a cylinder or tube, which is then cut lengthwise and flattened to form a continuous sheet. The relatively inelastic strands (MD) may optionally be oriented (similar to monofilament yarn processing to improve tensile properties, for example) in a second processing step by exposing the entire mesh structure to a MD stress.

Preferably, the elastomeric 12 and hard (incompressible and inelastic) strands 14 are orthogonal to each other, but this is not required. It should be noted that when this structure is uncompressed in the through thickness direction, that structure appears as shown in FIG. 3 where strands 12 in middle layer (2) appears in their straight or uncompressed state, and strands 14 lie on either side of the middle layer (2). However, when this structure is compressed due to an applied normal load to the structure's surface in the through thickness direction, that structure appears as shown in FIG. 4 where strands 12 in middle layer (2) conform themselves to the circumference of strands 14 in layers (1) and (3) so that strands 14 of layer (1) nest between immediately adjacent strands 14 from layer (3). One advantage of forming a three layer extruded bicomponent netting product is the low cost to produce this material in comparison to conventional woven textile structures or independently bonded yarn arrays.

Note the hard (or relatively inelastic) strand 14 diameters, or sizes if nonround, can be equal to the elastomeric strand 12 diameter or sizes. However, the hard strand diameter or size may, in some instances, be greater than the elastomeric strand diameter or size, or vice versa. The diameters of round strands can range from 0.1 mm to 3.0 mm, however the preferred range is 0.2 mm to 0.5 mm.

Note strand systems (1) and (3) can be the same as each other or they can be different in terms of material, form, shape, etc. It is only required that the strands in layer (3) are spaced to fit between adjacent strands of layer (1) or vice versa. Strand shapes can include square, rectangular, elliptical or oval, triangular, star-shaped, grooved or any polygonal shape, and the dimension of the longest axis can be up to 3.0 mm.

Also note there does not have to be a one to one relationship between the number of strands of layers (1) and (3), but the number of strands in layer (3) can be only a fraction of the number of strands in layer (1) or vice versa. For example, layer (3) may contain only half the strands of layer (1) so that there are spaces between the strands of layer (3) in use, creating additional void volume/waterhandling/water removal capability when used in press fabrics. Strand spacing (from center to center) can be equal for both MD (hard) and CD (elastomeric) strands. However, the strand spacing may be varied based on the desired air or water permeability, open area, and void volume of the end structure. Maximum strand density can be based upon strand spacing being equal to two times the strand diameter, and minimum strand density can be based upon strand spacing being equal to three or more times the strand diameter. A bicomponent extruded mesh 10 with spacing being equal to three times the strand diameter is shown in FIGS. 5-6, for example.

Several materials can be used as the elastomeric strand material 12 which occupies the middle layer (2) of the three layer bicomponent extruded mesh or netting. Examples include styrene block copolymer, elastomeric copolyesters, elastomeric copolyamides, elastomeric polyolefins and thermoplastic polyurethanes. Similarly, several materials can be used as the hard strand or inelastic material 14. Examples include polypropylene, polyethylene, polybutene, polyesters, polyamides, hard polyurethanes, and copolymers of such resins. Whatever materials are selected for the elastomeric and hard strands, these materials must be bonded together as a result of the extrusion process. One knowledgeable in polymeric materials knows that polymers can be formulated with additives to promote bonding between two different polymers. Clearly, forming bonds during the extrusion of the netting is critical so selection of appropriate materials is paramount.

A high bond strength for the nodes (where the MD and CD strands cross and contact each other) of the strands is required. It is especially important if the extruded bicomponent netting or mesh is oriented (like in monofilament extrusion processing) in a second processing step. In this process step, high forces are transferred and distributed through the netting joints/nodes to and from netting strands in all directions. Without a good strand to strand bond at the joint/node, the product will tear apart and fail.

Advantages of the bicomponent elastomeric mesh of the present invention over all-elastomeric netting are many. For instance, the product may be designed with one set of properties in one direction, and another set of properties in the opposite direction. Specifically, high yield strength and dimensional stability can be designed by using a relatively inelastic polymer such as polypropylene in one direction (MD), while the elastomeric (compression and recovery) properties of the mesh/netting are ensured by the use of a good elastomeric material in the transverse (CD) direction.

According to one embodiment, the inventive structure is a resilient bicomponent extruded mesh that utilizes a unique structure which provides excellent elastic behavior under a normal pressure load with high caliper or thickness in the through direction (normal to the structure plane) recovery. This structure 100, shown in FIG. 8, utilizes an elastic media 116 which is co-extruded along with the relatively inelastic strands 122, 114. This configuration allows the entire structure to 'collapse' into itself (compress), based upon the elasticity of this media 116 and the structure to conform under pressure (an applied load normal to the surface of the structure), and then recover to substantially the same original form and thickness after removal of the pressure, thus presenting a unique behavior. The term "bicomponent" in this instance refers to the use of two different materials in the MD and CD), one being a relatively inelastic material in the MD, and the other being an elastic material (i.e. the elastic media 116) in the CD. The structure 100 includes one or more layers of an elastic extruded film or sheet, wherein the extruded film or sheet is elastic, resilient, and compressible in a thickness direction and extensible, bendable, and resilient in the length and CD directions, and one or more layers of a plurality of substantially parallel functional MD strands co-extruded on the top and bottom surfaces of the extruded film or sheet.

Figure 8:
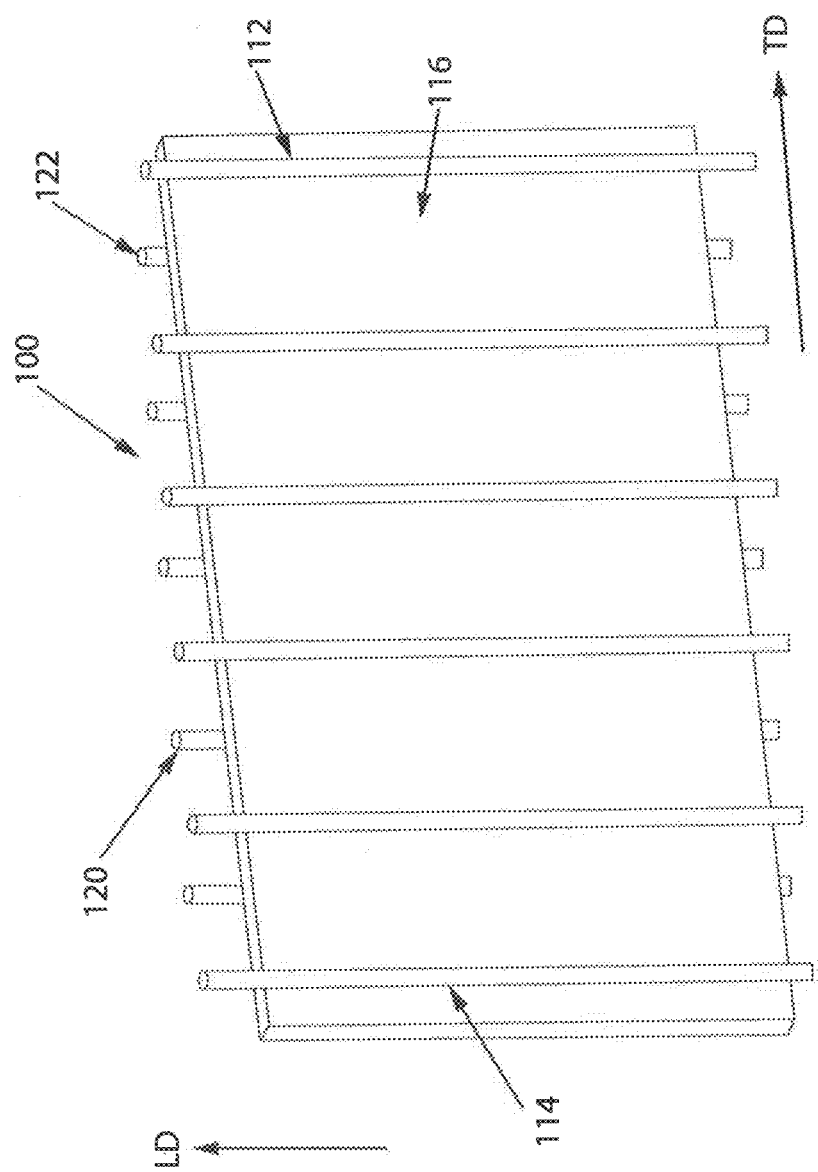
FIG. 8 is a profile view of a bicomponent extruded mesh, according to one embodiment of the present invention.

A schematic of a compressible resilient bicomponent extruded mesh formed according to this exemplary embodiment is shown in FIG. 8. As shown, bicomponent extruded mesh 100 has a first or top (1) layer 112 comprised of relatively inelastic, hard functional strands 114 in a parallel array oriented in the MD direction, a second or middle (2) layer 116 of an extruded film or sheet 116 having the elastic features as aforesaid, and a third or bottom (3) layer 120 comprised of functional strands 122 is co-extruded in the form of a parallel array on the other side (surface) of layer, 116. All three layers may be co-extruded together as one single structure, or alternatively, the top, middle, and bottom layers can be extruded sequentially and attached to each other. Strands 122 in layer 120 are positioned or aligned within the spaces between adjacent strands 114 in top (1) layer 112 as described above. The film or sheet 116 can have a thickness of 0.10 to 5.0 mm, although films or sheets having a thickness from 0.5 mm to 2.0 mm are preferred.

An elastic extruded film or sheet that is defined as elastic, resilient, and compressible in its thickness direction and extensible, bendable, and resilient in its length and CD directions is required for this embodiment. The elastic extruded film or sheet can optionally be perforated, as shown in FIG. 9, for example, so as to have a plurality of through holes or voids 115 distributed in a predetermined symmetric pattern or in a random asymmetric pattern. The elastic extruded film or sheet can be composed of any elastic material, such as thermoplastic polyurethane (TPU). Examples of good elastic materials include, but are not limited to, polymers such as polyurethane, rubber, silicone or that sold under trademarks Lycra® by Invista or Estane® by Lubrizol. The film or sheet 116 can have a thickness of 0.10 to 5.0 mm, although films or sheets having a thickness from 0.5 mm to 2 mm are preferred. The through holes formed in the film or sheet may have a suitably sized circular or non-circular shape. The non-circular shapes may include, but are not limited to, square, rectangular, triangular, elliptical, trapezoidal, hexagonal and other polygonal shapes. Holes can be formed in the film or sheet when it is extruded, or they can be mechanically punched or thermally formed after the structure is co-extruded. The openings of the holes in each surface of the film can have the same or different cross-sectional areas.

Figure 7:
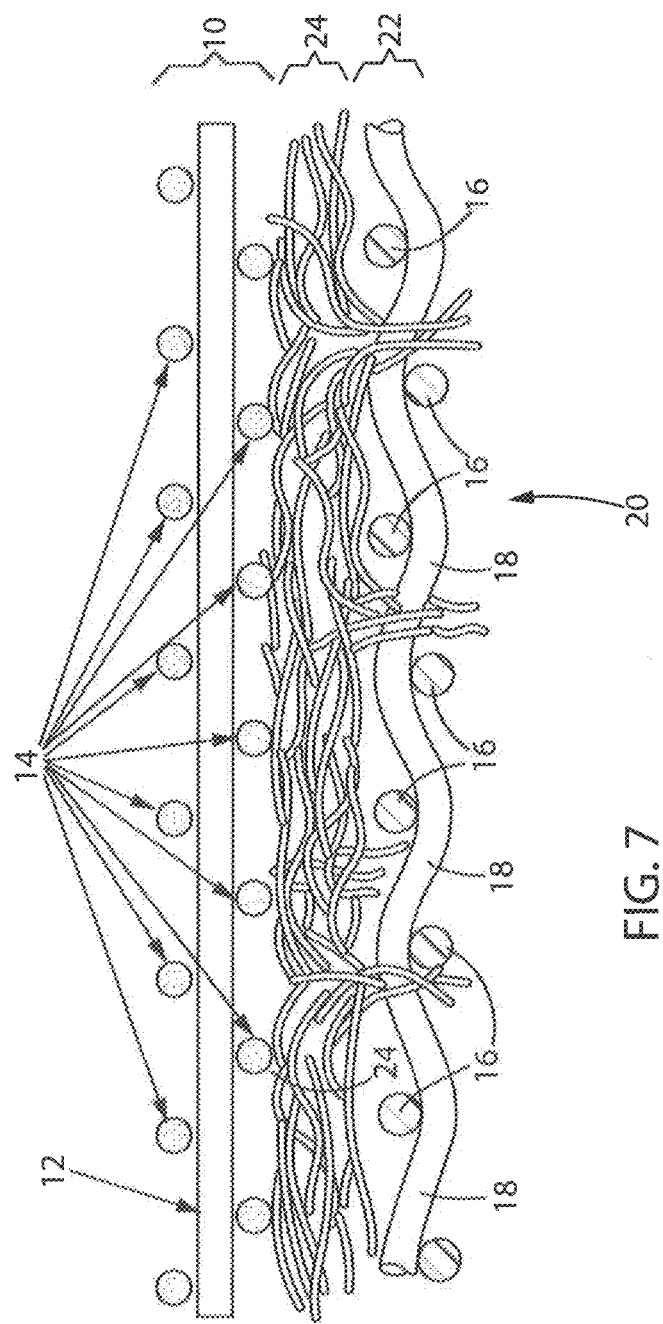
FIG. 7 is a schematic cross-sectional view of a bicomponent extruded mesh in an industrial fabric, according to one embodiment of the present invention.

According to one embodiment of the present invention, a fabric such as a press fabric 20 can include one or more layers of a woven fabric 22 attached to a top and/or bottom surface of the bottom surface of the bicomponent extruded mesh 10. An example is shown in FIG. 7, where the fabric 22 can be woven from lengthwise yarns 18 and crosswise yarns 16. The yarns 16, 18 may be any conventional textile yarns such as monofilament, multifilament, or spun yarns of natural or synthetic textile fibers. Representative of such yarns are monofilaments made from polyamides and polyesters. Fabric 22 may be fabricated in any weave, simple or complex, single or multilayered as conventionally known.

According to one embodiment, the extruded mesh can be structurally integrated with one or more layers of a nonwoven material 24 of textile fibers attached to the top and/or bottom surface of the woven layer 22 and/or the co-extruded structure itself by, for example, needling (needle punching), or use of adhesives or thermal fusion. The nonwoven material 24 attached to the bicomponent extruded mesh may be made up of any conventional textile fibers. Representative of such textile fibers are staple fibers of polyesters, polyamides, and the like.

According to another embodiment, one or more layers of nonwoven, textile fibers such as batt or spunbonded webs can be adhered to the outer surface of the bicomponent extruded mesh 10 itself, for example. The adherence of an additional layer(s) to the bicomponent extruded mesh 10 can also be by needling, adhesion, or thermal fusion. For simplicity, the embodiment fabric described has only two nonwoven fibrous layers. However, those skilled in the art will appreciate that any number of nonwoven fibrous layers such as the layer 24 may be built up to obtain a desired final fabric of a particular thickness, density, water permeability, and void volume.

While the bicomponent extruded mesh 10 discussed in the above embodiments are for a full-width of a press fabric, the inventive mesh can be formed according to the method disclosed in U.S. Pat. No. 6,240,608, the entire contents of which is incorporated herein by reference. As disclosed in this patent, the bicomponent extruded mesh can be constructed by forming a small strip of the mesh 10 and spirally winding it around two parallel rolls until a desired width of the bicomponent extruded mesh layer is achieved. The adjacent strips of the bicomponent extruded mesh 10 in such a structure can be joined at the abutting edges using methods known to one of ordinary skill in the art, for example, via use of glues, adhesives, or a thermal fusion/welding method as known to those skilled in the art.

The bicomponent extruded mesh can be processed, if necessary, to produce a smooth surface, and can be coated with foams, or impregnated with resins or foams that are also compressible and resilient in nature. Other forms including one or more layers of a membrane, yarn arrays (MD and/or CD), or a spiral link fabric can be laminated to the bicomponent extruded mesh. The structure which includes the compressible, resilient bicomponent extruded mesh must be constructed to have sufficient degree of compressibility as well as have sufficient elasticity as well as strength to allow the structure to rebound, or 'spring back,' as required upon exposure to, and removal of, an applied load normal to the structures surfaces for the end use.

The inventive bicomponent extruded mesh can form or be included in any number of final industrial process fabrics/belts including: paper machine clothing, such as a forming fabric, a press fabric, a dryer fabric, a shoe press belt base, a calendar belt base, a transfer belt base, or an engineered fabric or belt used in the production of nonwovens by processes such as airlaid, melt blowing, spunbonding, or hydroentangling, belts used in the manufacture of corrugated boxboard, or a textile finishing belt, or a tannery belt or sleeve.

For any of the embodiments of the bicomponent mesh or netting, while two layers of inelastic strands are taught, only one layer of inelastic (MD) load bearing (tensile) strands may be necessary for the structure to function in use, and the other layer on the other surface can also be elastic.

Furthermore, for any of the embodiments of the bicomponent (may be different elastomers or the same) mesh or netting, all three layers may be elastic as long as the mesh is laminated to a MD load (tensile) bearing structure, such as a woven fabric made from inelastic polyester or polyamide. According to one embodiment, the bicomponent mesh or netting in any of the previous embodiments can be turned 90.degree. so that the relatively inelastic functional MD strands are now in the CD and the elastic CI) strands or elastic material are in the MD as long as the mesh or netting is laminated to a MD load (tensile) bearing structure, such as a woven fabric made from inelastic polyester or polyamide.

Modifications to the present invention would be obvious to those of ordinary skill in the art in view of this disclosure, but would not bring the invention so modified beyond the scope of the appended claims.

The invention claimed is:

1. A method for forming an article comprising a bicomponent extruded mesh, the method comprising:
   extruding a first layer of parallel strands in a machine direction; co-extruding a second layer of parallel strands on one side of the first layer, the second layer's strands running in a cross-machine direction and comprising elastomeric strands; and
   co-extruding a third layer of parallel strands on an opposite side of the second layer as the first layer, the strands of the third layer running in a same direction as those of the first layer,
   wherein the first, second, and third layers are co-extruded together such that the strands in the first layer are positioned or aligned within respective spaces between strands in the third layer,
   wherein the first, second, and third layers form a bicomponent extruded mesh having a desired thickness,
   wherein under a compressive load the second layer stretches to enable the strands of the first and third layers to nest between each other such that the strands of the first and third layers are substantially coplanar,
   and wherein upon release of the compressive load, elasticity of the second layer causes the first and third layers to spring back returning the structure to substantially the desired thickness.

2. The method of claim 1, wherein strands in the first, second, and third layers are extruded polymeric elongate members which cross and intersect during extrusion to form a net-like structure.

3. The method of claim 1, wherein a number of strands in the third layer is less than a number of strands in the first layer or vice versa.

4. The method of claim 1, wherein the strands of the second layer are orthogonal to the strands of the first and third layers or are at an angle of less than 90 degrees to the strands of the first and third layers.

5. The method of claim 1, further comprising:
   extruding a fourth layer of parallel strands running in the same direction as the strands of the second layer, the strands of the fourth layer comprising elastomeric strands; and extruding a fifth layer of parallel strands running in the same direction as the strands of the first layer, wherein the strands of the fifth layer are aligned in respective vertical planes in a through thickness direction with respective strands of the first or third layers.

6. The method of claim 5, wherein the strands in the first, third, and fifth layers are selected from the group consisting of: polypropylene, polyethylene, polybutene, polyesters, polyamides, hard polyurethanes, and copolymers thereof.

7. The method of claim 1, wherein the elastomeric strands include an elastomeric material selected from the group consisting of: styrenic block copolymer, elastomeric copolyesters, copolyesters, elastomeric copolyamides, elastomeric polyolefins, thermoplastic polyurethanes, copolymers of elastomeric polyolefins, and copolymers of thermoplastic polyurethanes.

8. The method of claim 1, wherein the strands of at least one of the first, second, or third layers have a cross-section selected from the group consisting of: round, grooved, and a polygonal shape.

9. The method of claim 8, wherein the diameter of round strands is in the range of 0.1 mm to 3.0 mm.

10. The method of claim 8, wherein the strands of at least one of the first, second, or third layers have a cross-section selected from the group consisting of: square, rectangular, triangular, and star-shaped.

11. The method of claim 1, further comprising the step of: attaching one or more layers of a woven fabric, membrane, machine direction or cross-machine direction yarn array, or spiral link fabric to a top and/or bottom surface of the extruded mesh formed in claim 1.

12. The method of claim 11, further comprising the step of:
   attaching one or more layers of a spunbond nonwoven or batt to a top and/or bottom surface of the woven fabric, membrane, machine direction or cross-machine direction yarn array, or spiral link fabric and/or the extruded mesh.

13. The method of claim 1, further comprising the step of:
   attaching one or more layers of a nonwoven or batt to the extruded mesh formed in claim 1.

14. The method of claim 1, wherein the extruded mesh has a width smaller than a full-width of a final structure, and the final structure comprises a plurality of spirally wound strips of the extruded mesh.

15. The method of claim 14, wherein adjacent strips of the extruded mesh are joined via use of glues, adhesives, or a thermal fusion/welding method.

16. The method of claim 1, further comprising forming an industrial fabric from the extruded mesh formed in claim 1, wherein the industrial fabric is selected from the group consisting of:
a forming fabric;
a press fabric;
a dryer fabric;
a shoe press belt base;
a calendar belt base;
a transfer belt base;
an engineered fabric or belt used in the production of nonwovens made by a process of airlaying, melt blowing, spunbonding, or hydroentangling;
a belt used in the manufacture of corrugated boxboard;
a textile finishing belt;
a tannery belt; and
a tannery sleeve.

17. The method of claim 1, wherein the first and/or third layers comprise a relatively inelastic material.

18. The method of claim 1, wherein the first and/or third layers comprise an elastic material.

19. The method of claim 1, wherein the first and/or third layers comprise a relatively inelastic material and wherein the extruded mesh formed in claim 1 is turned 90° so that the relatively inelastic material is in the cross-machine direction and the elastomeric strands are in the machine direction.

20. The method of claim 19, wherein the extruded mesh is laminated to a machine direction load bearing structure including a woven fabric made from inelastic polyester or polyamide.

21. The method of claim 1, wherein the first and/or third layers comprise an elastic material and wherein the extruded mesh formed in claim 1 is laminated to a machine direction load bearing structure including a woven fabric made from inelastic polyester or polyamide.

22. The method of claim 1, wherein the strands of at least one of the first, second, or third layers have a cross-section selected from the group consisting of: elliptical and oval.

23. A method for forming an article comprising a bicomponent extruded mesh, the method comprising:
extruding a first layer of parallel strands in a machine direction;
extruding a second layer of an elastic material on one side of the first layer;
and extruding a third layer of parallel strands on an opposite side of the second layer as the first layer, the strands of the third layer running in a same direction as those of the first layer,
wherein the first, second, and third layers are co-extruded together such that the strands in the first layer are positioned or aligned within respective spaces between strands in the third layer,
wherein the first, second and third layers form a bicomponent extruded mesh.

24. The method of claim 23, wherein the elastic material is an elastic extruded film or sheet that is elastic, resilient, and compressible in a thickness direction and extensible, bendable, and resilient in a length direction.

25. The method of claim 24, wherein the elastic extruded film or sheet is composed of polyurethane, rubber, or silicone.

26. The method of claim 24, wherein the film or sheet has a thickness of 0.10 to 5.0 mm.

27. The method of claim 24, wherein the elastic extruded film or sheet comprises a plurality of through holes or voids distributed in a predetermined pattern.

28. The method of claim 27, wherein the plurality of through holes or voids have the same size or different sizes.

29. The method of claim 27, wherein the plurality of through holes or voids have a round or a polygonal shape.

30. The method of claim 29, wherein the plurality of through holes or voids have a square, rectangular, triangular, trapezoidal, or hexagonal shape.

31. The method of claim 27, wherein the plurality of through holes or voids are formed in the extruded mesh when the first, second, and third layers are co-extruded together, or the plurality of through holes or voids are mechanically punched or thermally formed after the first, second, and third layers are co-extruded together.

32. The method of claim 27, wherein the plurality of through holes or voids have a circular or elliptical shape.

33. The method of claim 23, further comprising attaching one or more layers of a nonwoven or batt to the extruded mesh formed in claim 23.

34. The method of claim 23, further comprising attaching one or more layers of a woven fabric, membrane, machine direction or cross-machine direction yarn array, or spiral link fabric to a top and/or bottom surface of the extruded mesh formed in claim 23.

35. The method of claim 34, further comprising:
attaching one or more layers of a nonwoven or batt to a top and/or bottom surface of the woven fabric, membrane, machine direction or cross-machine direction yarn array, or spiral link fabric and/or the extruded mesh.

36. The method of claim 23, wherein the strands of at least one of the first or third layers have a cross-section selected from the group consisting of: round, grooved, and a polygonal shape.

37. The method of claim 36, wherein the strands of at least one of the first or third layers have a cross-section selected from the group consisting of: square, rectangular, triangular, and star-shaped.

38. The method of claim 23, wherein the first and/or third layers comprise a relatively inelastic material.

39. The method of claim 23, wherein the first and/or third layers comprise an elastic material.

40. The method of claim 23, wherein the strands of at least one of the first or third layers have a cross-section selected from the group consisting of: elliptical and oval.

* * * * *